United States Patent

Loretti et al.

(10) Patent No.: US 6,468,259 B1
(45) Date of Patent: Oct. 22, 2002

(54) IMPERMEABLE FLEXIBLE MULTICOMPARTMENT BAG

(75) Inventors: Maurice Emile Loretti, Chàtelaine (FR); Raoul Chattot, Echallens; Sarah Djokic, Lausanne, both of (SE)

(73) Assignee: B. Braun Melsungen AG, Melsungen (DE)

(*) Notice: Subject to any disclaimer, the term of this patent is extended or adjusted under 35 U.S.C. 154(b) by 0 days.

(21) Appl. No.: 09/069,236

(22) Filed: Apr. 29, 1998

(30) Foreign Application Priority Data

May 2, 1997 (DE) .......................... 197 18 543

(51) Int. Cl.⁷ .................. A61B 19/00; B65D 75/00; B65D 85/00; B65D 30/22
(52) U.S. Cl. ................. 604/410; 604/408; 604/416; 206/828; 220/500; 383/38
(58) Field of Search ............... 383/38, 37, 39, 383/93–94; 604/403–416; 206/828; 220/500–502, 506

(56) References Cited

U.S. PATENT DOCUMENTS

| | | | |
|---|---|---|---|
| 4,469,361 A | | 9/1984 | Pendergraft |
| 5,207,320 A | * | 5/1993 | Allen ................ 206/220 |
| 5,356,668 A | * | 10/1994 | Paton et al. |
| 5,681,650 A | * | 10/1997 | Peiffer et al. ........... 428/212 |
| 5,783,269 A | * | 7/1998 | Heilmann et al. |
| 6,007,529 A | | 12/1999 | Gustafsson et al. |
| 6,231,559 B1 | * | 5/2001 | Loretti |

FOREIGN PATENT DOCUMENTS

| | | | |
|---|---|---|---|
| DE | 4410876 | * 10/1995 | ............. A61J/1/10 |
| DE | 19515254 | 10/1996 | |
| DE | 19536546 | 4/1997 | |
| DE | 19605357 | 8/1997 | |
| EP | 216509 | 4/1987 | |
| EP | 353193 | 9/1992 | |
| EP | 619998 | 3/1994 | |
| JP | 315471 | 1/1991 | |

* cited by examiner

*Primary Examiner*—Angela D. Sykes
*Assistant Examiner*—P. M. Bianco
(74) *Attorney, Agent, or Firm*—Brobeck, Phleger & Harrison LLP

(57) ABSTRACT

The present invention relates to an impermeable flexible multicompartment bag for medical use for sterile solutions, and to a method for the preparation of such bags. Impermeable flexible multicompartment bags for medical use for sterile solutions for perfusions, consisting of two welded sheets of a composite material wherein the sheets forming the inner wall of the bag consist of a polypropylene and are bonded to an outer layer of a thermoplastic polymer by means of a polyolefin layer, characterized in that the sheets facing the contents of the bags which are made of a homophase copolymer of propylene are immediately welded in the intercompartment region and in the peripheral region such that the weld forming the intercompartment region can be ruptured with a force in the range of from 10 to 30 N while the weld in the peripheral region cannot be ruptured.

11 Claims, 2 Drawing Sheets

IMPERMEABLE FLEXIBLE MULTICOMPARTMENT BAG

The present invention relates to an impermeable flexible multicompartment bag for medical use for sterile solutions, and to a method for the preparation of such bags.

In the pharmaceutic industry, and especially in the field of perfusion solutions, impermeable flexible bags are extensively used. Such bags are prepared from polymerized materials which have to meet a wide variety of requirements. Thus, in particular, gas and vapor tightness, transparency, printability and inertness towards the substances they contain are of essential importance. The substances essentially consist of salts and solutions thereof, carbohydrates, amino acids and lipids. They are employed in multicompartment bags, the individual compartments being filled with different components.

DE 44 10 876 A1 relates to a multicompartment bag made of a polymeric material whose bag compartments are formed by welds in the peripheral region and by at least one weld in the intercompartment region, the welds being formed from the polymeric materials facing the compartments.

The polymeric materials facing the compartments are inseparably welded together in the peripheral region, and are welded together in the intercompartment region in such a way that the weld can be ruptured with a force in the range of from 5 to 20 N. The different strengths of the bondings are achieved by varying welding temperatures in the welding process. The layer of the multilayer sheet which faces the compartments, referred to herein as the inner layer, essentially comprises two components, namely a matrix polymer and a phase polymer. The system of matrix and phase polymer is also referred to as a matrix-phase polymer system.

EP 0 619 998 A1 also describes a multicompartment container with a peeling weld. The multilayer comprises at least one radiofrequency-sensitive layer and one inner layer facing the contents of the compartment which is made of a non-radiofrequency-sensitive material. When the layers are subjected to radiofrequency irradiation, the inner, sensitive layer is heated and can thus be welded with the opposite side. As the materials for the heat-sealable layer, an alloy of styrene-ethylene-butylene-styrene (SEBS) and ethylene-propylene copolymer is described. However, this material is very expensive and therefore only conditionally suitable for a product sold on a large scale.

On the other hand, from EP 0 353 193 B1, there is known an impermeable flexible bag for sterile solutions for medical use, in particular a flexible bag for perfusions, characterized by being made of two welded sheets of a multilayer sheet material comprising an 11-aminoundecanoic acid polyamide film bonded by at least one of its faces to a polypropylene film, by means of a polyolefin film, said polypropylene films forming the inner wall of said impermeable flexible bag. Said polypropylene may be either a propylene homopolymer or a copolymerizate of propylene and ethylene.

The object of the present invention is to provide an inexpensive impermeable flexible multicompartment bag for medical use which is suitable for subjecting the substances contained therein to heat sterilization at 121° C., especially to provide a bag which does not require an over bag for clinical applications.

Figure 1:
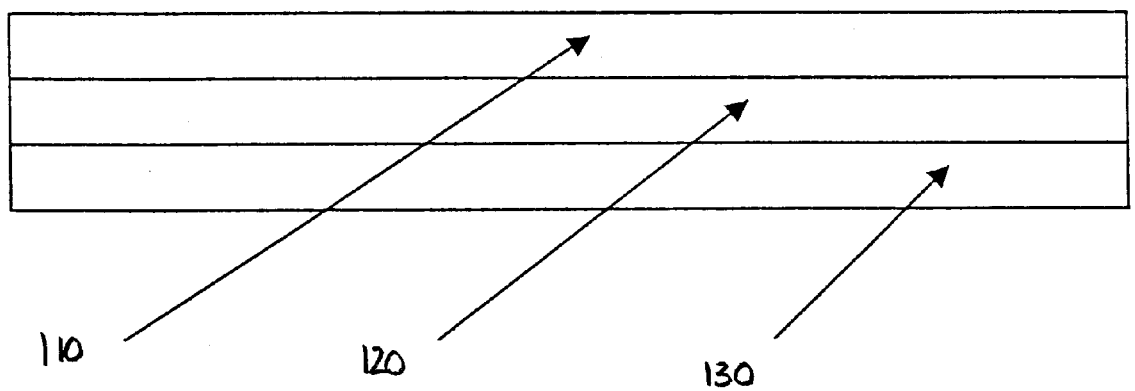
FIG. 1 schematically shows an example of the three layers according to one embodiment of the present invention. The three layers to the invention are: the outer layer which is composed of a thermoplastic polymer (110), the middle layer which is composed of a polyolefin (120), and the inner layer which is composed of homophase polypropylene copolymer (130).
Figure 2:
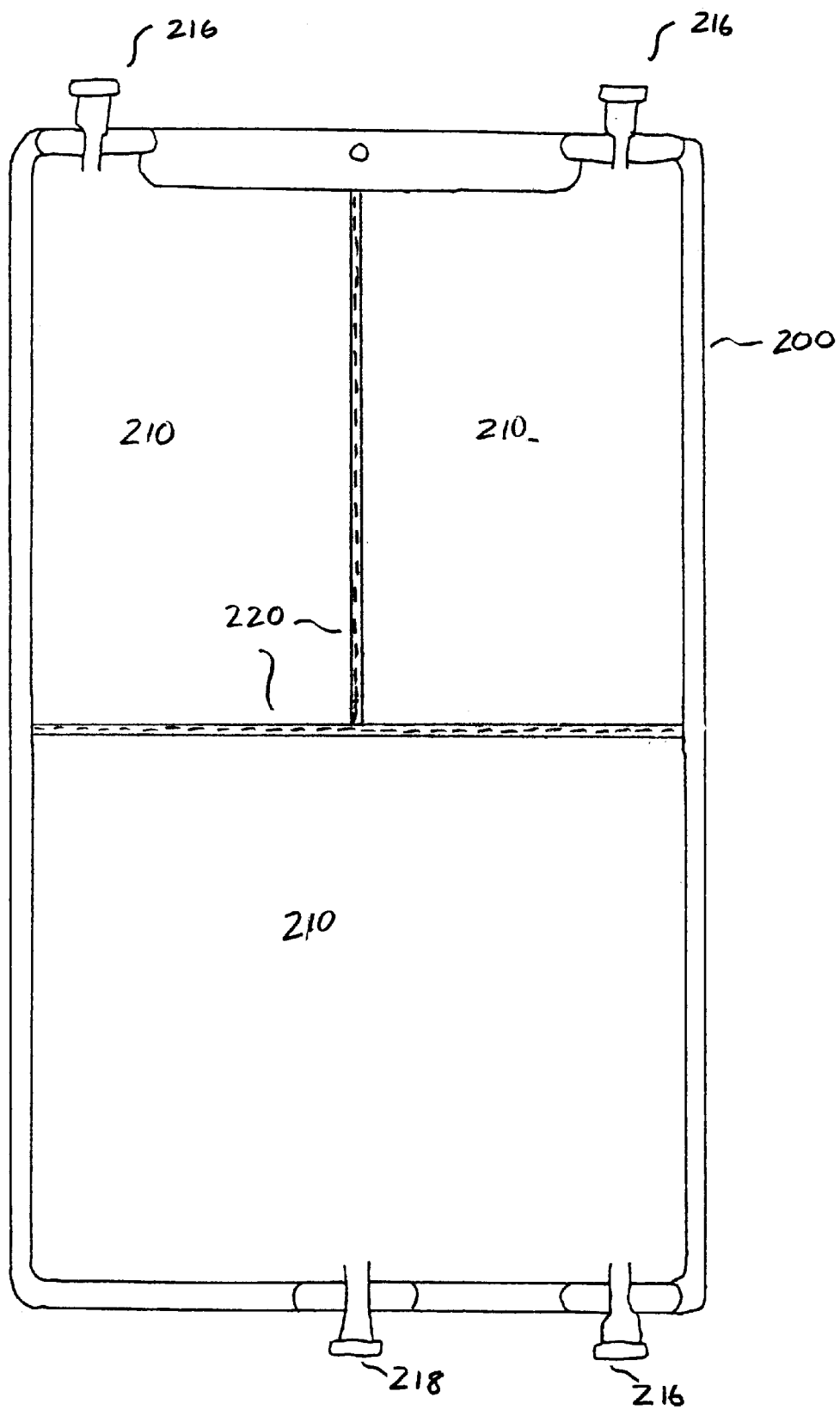
FIG. 2 schematically shows an overview of multiple compartment bag 200 according to one embodiment of the present invention. Multiple compartment bag 200 includes compartments 210. Each compartment 210 has a fill orifice 216, and bag 200 has outlet 218. Compartments 210 are separated by rupturable weld 220.

According to the invention, it has been found that, when defined conditions are observed, a composite material made of a homophase polypropylene copolymer which is bonded to an outer layer of a thermoplastic polymer by means of a polyolefin layer can be used to prepare a suitable impermeable flexible multicompartment bag having a weld in the intercompartment region which can be ruptured with a force in the range of from 10 to 30 N while the weld in the peripheral region cannot be ruptured.

Accordingly, in a first embodiment of the present invention, impermeable flexible multicompartment bags for medical use for sterile solutions for perfusions consist of two welded sheets of a composite material, wherein the sheets forming the inner wall of the bag consist of a polypropylene and are bonded to an outer layer of a thermoplastic polymer by means of a polyolefin layer, characterized in that the sheets facing the contents of the bags which are made of a homophase copolymer of propylene are immediately welded in the intercompartment region and in the peripheral region such that the weld forming the intercompartment region can be ruptured with a force in the range of from 10 to 30 N while the weld in the peripheral region cannot be ruptured.

If the weld in the intercompartment region can be ruptured with too weak a force, a safe separation of the contents of the compartments during storage and shipping is not ensured since the intercompartment region will then be opened by small mechanical actions already. However, if the force required for opening the parting weld is too strong, it may be difficult for the hospital staff to open this parting region. In addition, there is a risk that the bag will break somewhere else.

The multicompartment bags according to the invention can be filled in a simple manner without the risk of premature mixing of the components. In addition, it has been found that the multicompartment bags according to the invention can be sterilized at a temperature of 121° C. without any problem.

An essential realization with the present invention is that particles of the plastic material were not found in the sterile solution after opening the intercompartment region. The rupture strength of the weld is sufficiently high for the bags to exhibit a safe breaking resistance when dropped from a height of 1.50 m and a good breaking resistance when dropped from a height of 2.00 m.

The multicompartment bags according to the invention are easily prepared since the usual breaking seals for the separation of the individual compartment regions which have been usual to date are not necessary. This provides the advantage of a quick and thorough mixing of the components after opening.

For the preparation of the multicompartment bags, per se known sheet blowing or tube blowing methods can be employed as is known, especially, from EP 0 353 193 B1.

As usual in the prior art, the multicompartment bags according to the invention contain at least one connection piece in at least one compartment in the weld of the peripheral region wherein such connection piece can be designed as an inlet and/or outlet connection piece. Of course, the multicompartment bags according to the invention may also have suspension means per se known in the prior art, which may be designed, for example, in the form of an opening in the weld lying opposite the outlet connection piece.

The rupturable weld in the intercompartment region can be ruptured, for example, by applying pressure to at least one of the adjacent compartments. This may be done, for instance, with the flat of the hand. If the compartments are not completely filled and firm, it is also possible, in addition, to rupture the rupturable weld in the intercompartment region by tearing opposite surfaces of a compartment apart.

In a particular embodiment of the present invention, the multicompartment bags comprise at least three compartments for separately containing carbohydrates, lipids and electrolytes. Similarly, it is particularly preferred that the multicompartment bags are designed to comprise four compartments for separately containing carbohydrates, lipids, electrolytes and vitamins, wherein the components are preferably arranged in the compartments in the way as illustrated in DE 196 05 357.

The homophase copolymer of propylene is a per se known material and is appreciated in many fields. For the bag according to the present invention, a polymer having a melting point in the range of 150 to 160° C. is preferably employed. For example, the homophase copolymer of propylene which is obtainable under the designation APPRYL 3020 SM3 and contains about 3% by weight of polyethylene can be employed to particular advantage since this material is well suitable for opening the peeling weld after injection molding. This polypropylene is essentially impermeable to water vapor, a quality which is advantageously combined with those of the thermoplastic polymer of the outer sheet.

According to the invention, the multilayer material of the bags can be combined in a wide variety of ways as compared with other complex materials:

it can be prepared by coextrusion, a preparation process which is more advantageous than co-rolling;

it enables unobjectionable steam sterilization at 121° C. while other materials of the prior art will more or less gradually decompose at this temperature.

For welding the peripheral region, the welding head of the selected device can be maintained at a temperature sufficient to melt the polypropylene sheet without modifying the outer thermoplastic sheet which should have a melting point above the welding temperature and thus forms a protective film. A number of such materials are known to those skilled in the art, for example, EVOH, PVDC or various polyamides.

Thus, it is possible to prepare the multicompartment bag of the present invention by coextruding the polypropylene, the selected polyolefin binder and the thermoplastic polymer, i.e. directly from the corresponding pellets without prior preparation of the individual sheets. For this purpose, known sheet blowing or tube blowing techniques are advantageously employed.

The use of double outer and polypropylene films enables a considerable increase in the mechanical resistance of the sheets which thus form multilayer materials of the bags according to the invention.

Particularly preferred thicknesses of the individual sheet layers are known from the prior art and need not be changed according to the invention.

Special attention is to be drawn to the intercompartment region. While a stable hot-sealed weld is desired in the peripheral region, it is required according to the present invention that the intercompartment region have a lower strength than the peripheral region. In this connection, it is suggested in DE 44 10 876 A1 that the molecular structure of the inner layer of the multilayer sheet has chain regions which require much heat and, in other regions, significantly less heat (energy uptake) for the excitation of vibrations. This heterophase structure is supposed to cause that welding at a lower temperature will only melt those regions which require a low energy uptake for melting. This is called partial melting. In contrast, at the higher temperature, both the regions which require a low energy uptake and the regions which require a high energy uptake will melt. A more or less complete melting of the inner layer occurs, in particular in the peripheral region. Such different melting behavior is ensured by a different temperature control in the welding of the different welds.

According to the invention, however, the molecular structure of the inner layer of the multicompartment bags does not contain any chain regions which require a high (heat) energy uptake and, in other regions, significantly lower energy uptake for the excitation of vibrations. Rather, a weld having the desired characteristics is formed by exactly adjusting the temperature in the intercompartment region to below the melting temperature of the homophase polypropylene copolymer.

Thus, another aspect of the present invention is a method for the preparation of the above defined multicompartment bags, the method being characterized in that the intercompartment region of the sheet is welded at a temperature below the welding temperature of the peripheral region, in particular below the melting temperature or melting range of the polypropylene which froms the inner wall of the container.

Homophase copolymer of propylene is a thermoplastic material and thus, of course, has no exact melting point. However, by differential thermogravimetric analysis or other analogous methods, it is possible to determine the maximum/minimum in the melt transition curve.

According to the invention, it has now been found that, for achieving rupturability of the intercompartment region, it is required that the welding of the intercompartment region be performed at a temperature significantly below the minimum of the melting range of the polypropylene, in particular at a temperature of 10 to 20° C. below the melting range of the polypropylene. Particularly preferred is a temperature of above 136° C., especially in the range of 137.5° C.±1° C. Of course, this is supposed to mean the temperature of the melting electrode.

Temperatures of below 136° C. involve the risk that the weld in the intercompartment region already tears during the filling of the contents since the latter are washed into the compartments in part at a high liquid pressure.

In a sterility test, it could be established that no problems occurred in the storage, shipping and opening of the peeling weld with multicompartment bags the intercompartment regions of which were hot-sealed at a temperature of 136.5° C.

Irrespective of the temperature of the hot-sealing step of the intercompartment region, it could be found no instance in which particles entered the solutions from the opening of the intercompartment region.

What is claimed is:

1. An impermeable flexible multicompartment bag for medical use comprising two sheets of a composite material welded together to form a bag having an inner surface, an outer surface, and intercompartment regions, each sheet comprising a polypropylene layer bonded to a layer of a thermoplastic polymer by a polyolefin layer, the polypropylene layer being an one-phase copolymer of propylene having a homogeneous structure with uniform melting temperature range throughout the polypropylene layer; a peripheral weld in the peripheral region, so that the polypropylene layer forms the inner wall of the bag, being resistant to rupture by force less than a force great enough to rupture the sheets; and at least one inner weld formed by welding the interior of the sheets at a temperature of above 136° C., wherein the inner weld, peripheral weld, and sheets form a bag with the intercompartment region and the inner weld can be ruptured with a force in the range of from 10 to 30 N.

2. The multicompartment bag according to claim 1, comprising at least three compartments for separately containing carbohydrates, lipids and electrolytes.

3. The multicompartment bag according to claim 1, comprising at least four compartments for separately containing carbohydrates, lipids, electrolytes and vitamins.

4. A method for the preparation of multicompartment bag according to any one of claims 1 to 3, characterized in that the intercompartment region is welded at a temperature below the melting range of the peripheral region, in particular at a temperature below the melting range of the sheets forming the inner wall of the bag.

5. The method according to claim 4, characterized in that the inner weld forming the intercompartment region is welded at a temperature of above 137.5° C.±1° C.

6. The impermeable flexible multicompartment bag according to claim 1, wherein the bag is sterile by sterilizing the bag using heat sterilization at a temperature of 121° C.

7. The impermeable flexible multicompartment bag according to claim 1, wherein the polypropylene has melting point in the range of 150° C. to 160° C.

8. The impermeable flexible multicompartment bag according to claim 1, wherein the polypropylene layer has about 3% by weight of polyethylene.

9. The impermeable flexible multicompartment bag according to claim 1, wherein the polypropylene is impermeable to water vapor.

10. The impermeable flexible multicompartment bag according to claim 1, wherein the interior weld is welded at a temperature of above 137.5° C.±1° C.

11. An impermeable flexible multicompartment bag for medical use comprising
- two sheets of a composite material having an inner surface, an outer surface, each sheet comprising a polypropylene layer bonded to a layer of a thermoplastic polymer by a polyolefin layer, the polypropylene layer being an one-phase copolymer of propylene having a homogeneous structure with uniform melting temperature range throughout the polypropylene layer in the range of 150° C. to 160° C.;
- a peripheral weld along periphery of the two sheets to form the bag and being resistant to rupture by force less than a force great enough to rupture the sheets; and
- at least one inner weld formed by welding the interior of the sheets at a temperature of 136° C.,
- wherein the inner weld, peripheral weld, and sheets form a bag with an intercompartment region and the inner weld can be ruptured with a force in the range of from 10 to 30 N.

\* \* \* \* \*